United States Patent
Bush et al.

(10) Patent No.: US 11,509,954 B2
(45) Date of Patent: Nov. 22, 2022

(54) CATV RETURN BAND SWEEPING USING DATA OVER CABLE SERVICE INTERFACE SPECIFICATION CARRIERS

(71) Applicant: VIAVI SOLUTIONS INC., San Jose, CA (US)

(72) Inventors: John J. Bush, Bargersville, IN (US); Gary W. Sinde, Indianapolis, IN (US)

(73) Assignee: VIAVI SOLUTIONS INC., San Jose, CA (US)

(*) Notice: Subject to any disclaimer, the term of this patent is extended or adjusted under 35 U.S.C. 154(b) by 0 days.

(21) Appl. No.: 16/813,281

(22) Filed: Mar. 9, 2020

(65) Prior Publication Data
US 2020/0351542 A1 Nov. 5, 2020

Related U.S. Application Data

(63) Continuation of application No. 14/830,204, filed on Aug. 19, 2015, now Pat. No. 10,623,809.

(60) Provisional application No. 62/040,491, filed on Aug. 22, 2014.

(51) Int. Cl.
*H04N 21/437* (2011.01)
*H04N 21/61* (2011.01)
*H04N 21/426* (2011.01)

(52) U.S. Cl.
CPC ..... *H04N 21/437* (2013.01); *H04N 21/42676* (2013.01); *H04N 21/6118* (2013.01); *H04N 21/6168* (2013.01)

(58) Field of Classification Search
CPC ............ H04N 21/437; H04N 21/6118; H04N 21/42676; H04N 21/6168
See application file for complete search history.

(56) References Cited

U.S. PATENT DOCUMENTS

| | | | |
|---|---|---|---|
| 6,453,472 B1* | 9/2002 | Leano | H04N 21/42676 725/111 |
| 7,085,306 B1* | 8/2006 | Voidman | H04B 1/715 348/E7.063 |
| 7,213,257 B1* | 5/2007 | Emsley | H04N 17/00 348/180 |
| 2001/0055319 A1* | 12/2001 | Quigley | H04L 12/2801 370/480 |
| 2002/0191684 A1* | 12/2002 | Min | H04L 27/34 375/222 |
| 2006/0120282 A1* | 6/2006 | Carlson | H04N 21/64738 370/431 |
| 2006/0230423 A1 | 10/2006 | Burgett | |
| 2007/0121712 A1* | 5/2007 | Okamoto | H04L 1/24 375/222 |
| 2009/0048835 A1* | 2/2009 | Masuko | G10L 17/02 704/236 |
| 2009/0125960 A1 | 5/2009 | Cooprider | |
| 2010/0309805 A1* | 12/2010 | Jones, Jr. | H04L 43/50 370/252 |
| 2012/0213259 A1* | 8/2012 | Renken | H04N 21/42676 375/222 |
| 2013/0003565 A1* | 1/2013 | Gotwals | H04L 43/50 370/248 |

(Continued)

*Primary Examiner* — Michael R Telan
(74) *Attorney, Agent, or Firm* — Mannava & Kang, P.C.

(57) ABSTRACT

The existing Data Over Cable Service Interface Specification (DOCSIS) carriers generated by field test equipment or by the CATV subscriber modems are used to determine the amplitude response of the return band in a CATV system.

18 Claims, 4 Drawing Sheets

(56) References Cited

U.S. PATENT DOCUMENTS

2013/0125183 A1 5/2013 Gomez
2014/0254392 A1* 9/2014 Wolcott ............... H04W 24/08
370/242
2014/0344874 A1 11/2014 Olsen

* cited by examiner

CATV RETURN BAND SWEEPING USING DATA OVER CABLE SERVICE INTERFACE SPECIFICATION CARRIERS

CROSS-REFERENCE TO RELATED APPLICATIONS

This application is a Continuation of commonly assigned and co-pending U.S. application Ser. No. 14/830,204 filed Aug. 19, 2015, which claims priority to U.S. Provisional Patent Application No. 62/040,491 filed Aug. 22, 2014, the disclosures of which are hereby incorporated by reference in their entireties.

BACKGROUND

In CATV (hereinafter sometimes cable TV or cable), the return band (hereinafter sometimes upstream) describes the frequency range allocated for transmission of signals from the subscriber premises back to the cable company. In typical designs, this frequency range is from 5 MHz to 42 MHz, 5 MHz to 65 MHz, 5 MHz to 85 MHz, or in the not-too-distant future 5 MHz to 200 MHz (see FIG. 1). Typical signals coming from the subscriber premise include, for example, set top box DVR/On Demand requests, test equipment data channels, and Data Over Cable Service Interface Specification ("DOCSIS") Internet Protocol output cable modem carriers.

As part of performing an installation or servicing a CATV system, it is sometimes necessary to check the linearity in the downstream in CATV systems. In the past, to determine linearity in the downstream, installers and technicians have compared the amplitudes of downstream channels as they installed, or were troubleshooting, a subscriber's installation, and either adjusted the levels accordingly or otherwise determined what was responsible for the amplitude differences and took whatever steps were necessary to correct them.

In the past, to maintain linearity in the upstream in CATV systems, test equipment has transmitted swept carriers upstream to a signal analyzer constructed for this purpose, such as, for example, the Trilithic SST-9581, and monitored these carriers. Again, differences in amplitude were corrected by whatever means were appropriate under the circumstances. The sweep of the carriers had to avoid active upstream channels in the 5 MHz to 42 MHz bandwidth, or 5 MHz to 65 MHz bandwidth, 5 MHz to 85 MHz bandwidth, whichever is being used for upstream communication.

A significant problem with this scheme for the future is that the active upstream bandwidth is filling up with content. As a result, the sweeping carrier cannot appear in many places in the upstream band without risking interfering with upstream-bound signals. There are, however, the active upstream channels themselves.

SUMMARY

According to one aspect, a method for determining the linearity of a CATV return band comprises permitting a cable modem to log in to a Cable Modem Termination System (CMTS); determining the transmit carrier frequency, symbol rate, and level for each active carrier in the return band; determining the transmit carrier ranging error level for each active carrier in the return band; determining the transmit carrier pre-equalizer filter coefficients for each active carrier in the return band; adjusting each active return band carrier level by its ranging error and determining the average transmit level; determining the in-channel response for each active carrier in the return band; and, generating a return band frequency response.

Illustratively according to this aspect, determining the transmit carrier ranging error level for each active carrier in the return band comprises using at least one of the cable modem and the CMTS Simple Network Management Protocol (SNMP) Management Information Base (MIB) to determine the transmit carrier ranging error level for each active carrier in the return band.

Illustratively according to this aspect, determining the transmit carrier pre-equalizer filter coefficients for each active carrier in the return band comprises using the transmit carrier pre-equalizer filter coefficients for each active carrier in the return band from the cable modem to determine the transmit carrier pre-equalizer filter coefficients for each active carrier in the return band.

Illustratively according to this aspect, adjusting each active return band carrier level by its ranging error and determining the average transmit level comprises establishing the average transmit level as the zero reference of the frequency spectrum for the return band.

Illustratively according to this aspect, determining the in-channel response for each active carrier in the return band comprises using the upstream pre-filter coefficients to determine the in-channel response for each active carrier in the return band.

Illustratively according to this aspect, generating a return band frequency response comprises plotting each upstream carrier's in-channel response.

According to another aspect, a method for determining the linearity of a CATV return band comprises constructing a representation of the upstream frequency response using: the cable modems' transmit power for each Data Over Cable Service Interface Specification (DOCSIS) carrier in the return band; the offset error of each DOCSIS carrier in the return band; and, the in-channel pre-equalizer filter coefficients for each DOCSIS carrier in the return band.

BRIEF DESCRIPTION OF THE DRAWINGS

The invention may best be understood by referring to the following detailed description and accompanying drawings which illustrate the invention. The detailed description particularly refers to the following figures, in which.

DETAILED DESCRIPTION OF THE DRAWINGS

Figure 1:
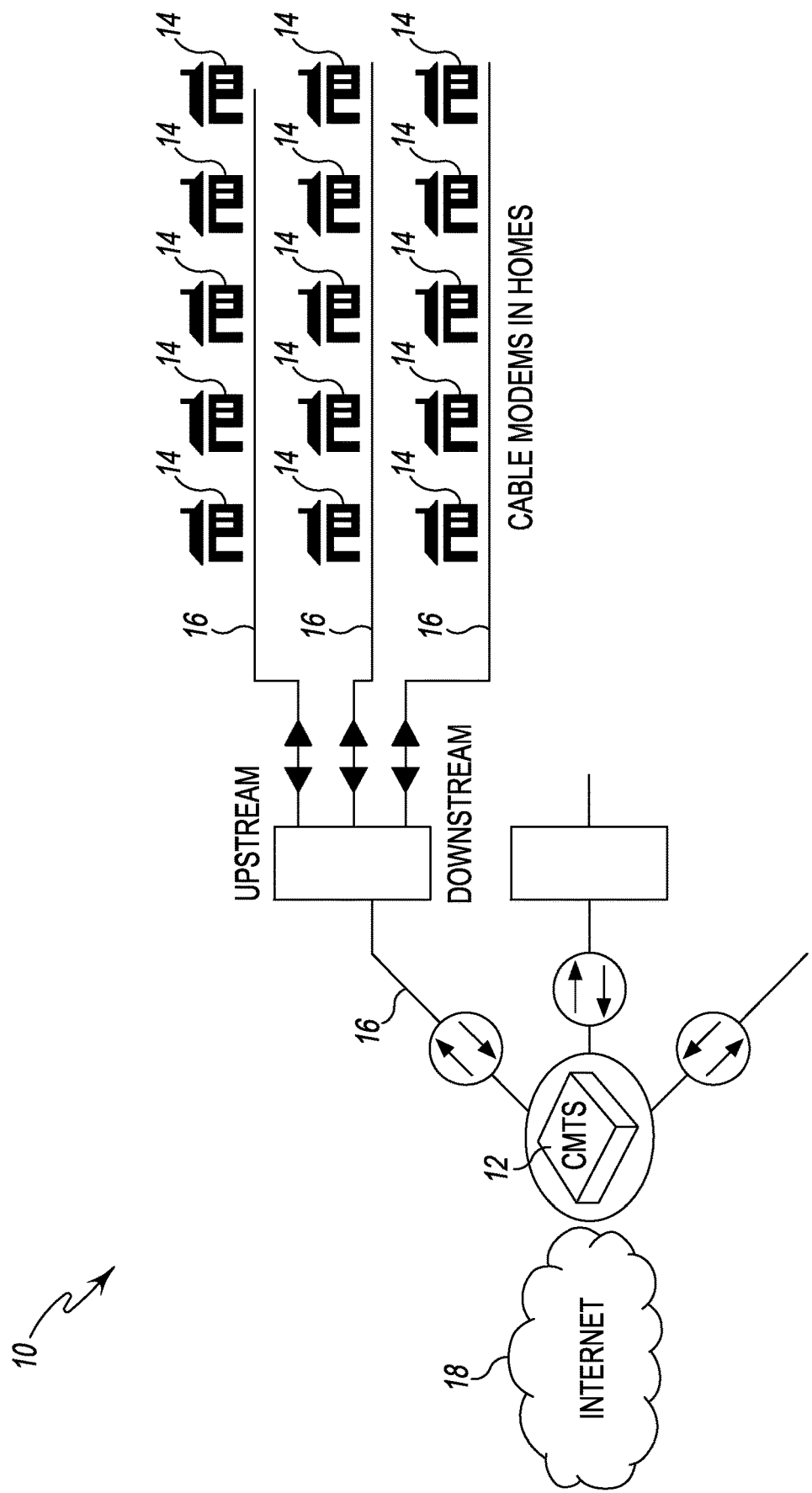
FIG. 1 illustrates a return band containing the frequency range allocated for transmission of signals from the subscriber premises back to the cable company.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

As shown in FIG. 1, a CATV system 10 includes a Cable Modem Termination System (hereinafter sometimes CMTS) 12 that may be located at a cable company's head end or local office. The CMTS 12 communicates with a number of cable modems 14 located in subscribers' homes. The CMTS 12 is connected to the cable modems 14 via a plurality of data lines 16, which may be coaxial or optical fiber cables. The CMTS 12 also communicates with the other components of the CATV system 10 via the Internet 18. To do so, the CMTS 12 is configured to convert signals it receives from each cable modem 14 into Internet Protocol (IP) packets, which are then transmitted over the Internet 18. Transmissions from the cable modems 14 to the CMTS 12 are sometimes referred to as "upstream" transmissions or signals. The CMTS 12 is also configured to send signals "downstream" to the cable modems 14 by processing the signals it receives via the Internet 18 and then transmitting them to the cable modems 14.

The cable system 10 may include any number of "upstream" and "downstream" channels. Currently, cable systems provide either four or eight active upstream channels in the upstream band, but there are plans to provide as many as 8192 upstream channels in the not-too-distant future. Four or eight channels spread out over the upstream bandwidth will give some indication of linearity. Additionally, however, current cable modems include twenty-four channel graphic equalizers, which flatten the Quadrature Amplitude Modulation (hereinafter QAM) frequency response of each channel. The twenty-four graphic equalizer filter coefficients (which are basically the inverse of a filter's transfer function) are available, which permits as many as twenty-four times four or twenty-four time eight points (96 or 192 points) for use in linearizing the upstream bandwidth.

Figure 2:
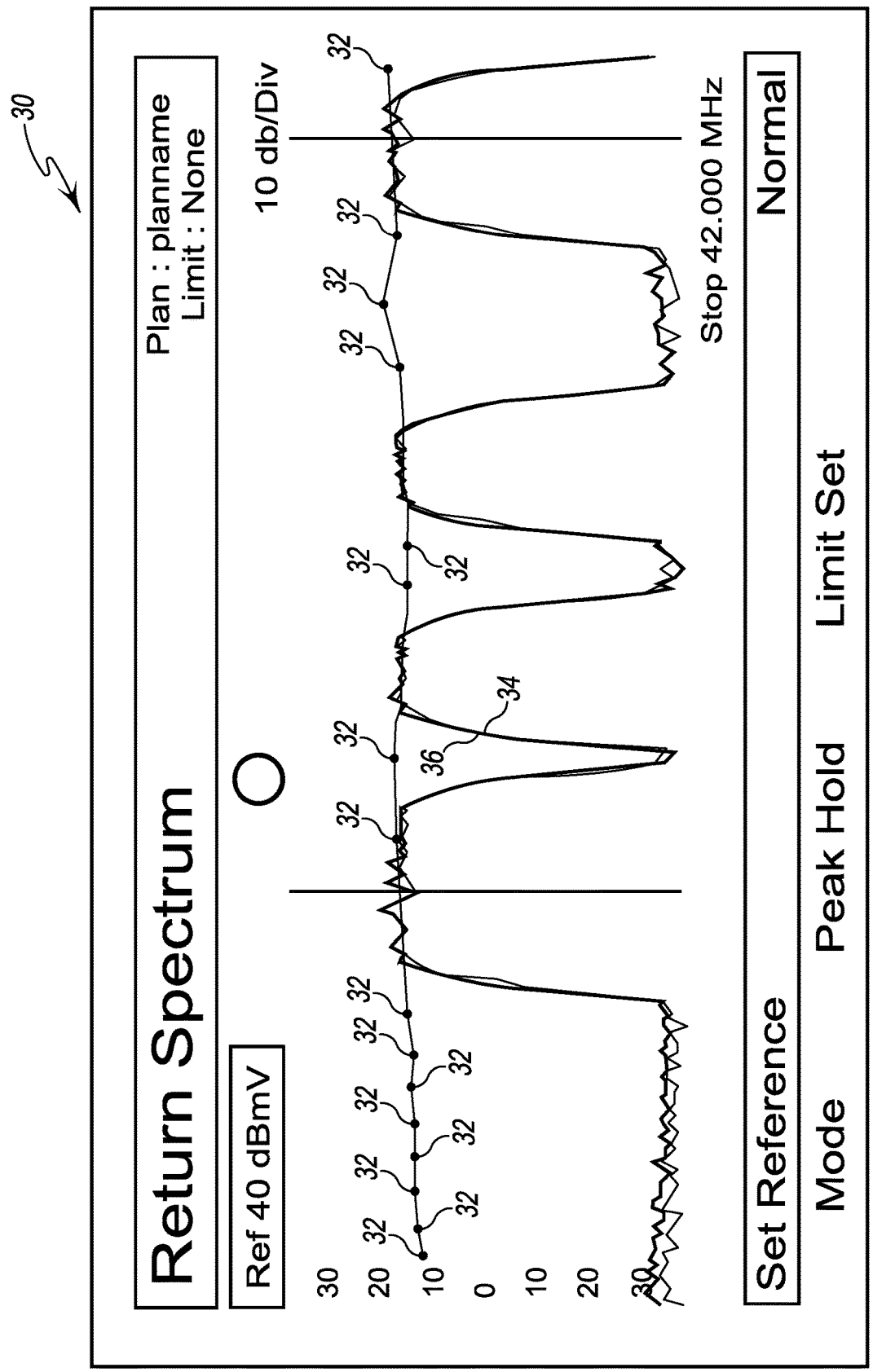
FIG. 2 illustrates the current method used to check for interference and flatness by test equipment manufacturers.

The return band, like any other frequency band allocated for communication, is desired to be as devoid as possible of interference and with minimum amplitude variation. Referring to FIG. 2, the current method 30 used to check for interference and flatness by test equipment manufacturers is to insert test carriers 32 between live signals 34, 36, receive these signals with an analyzer such as, for example, the Trilithic SST-9581, and basically connect the red dots, producing a frequency flatness trace 38. Again, the problem with this method is available bandwidth. As cable system operators attempt to monetize bandwidth by increasing DOCSIS speeds, they place more and more data carriers in the return band, using up the bandwidth available for enough test carriers to make an accurate flatness plot.

Figure 3:
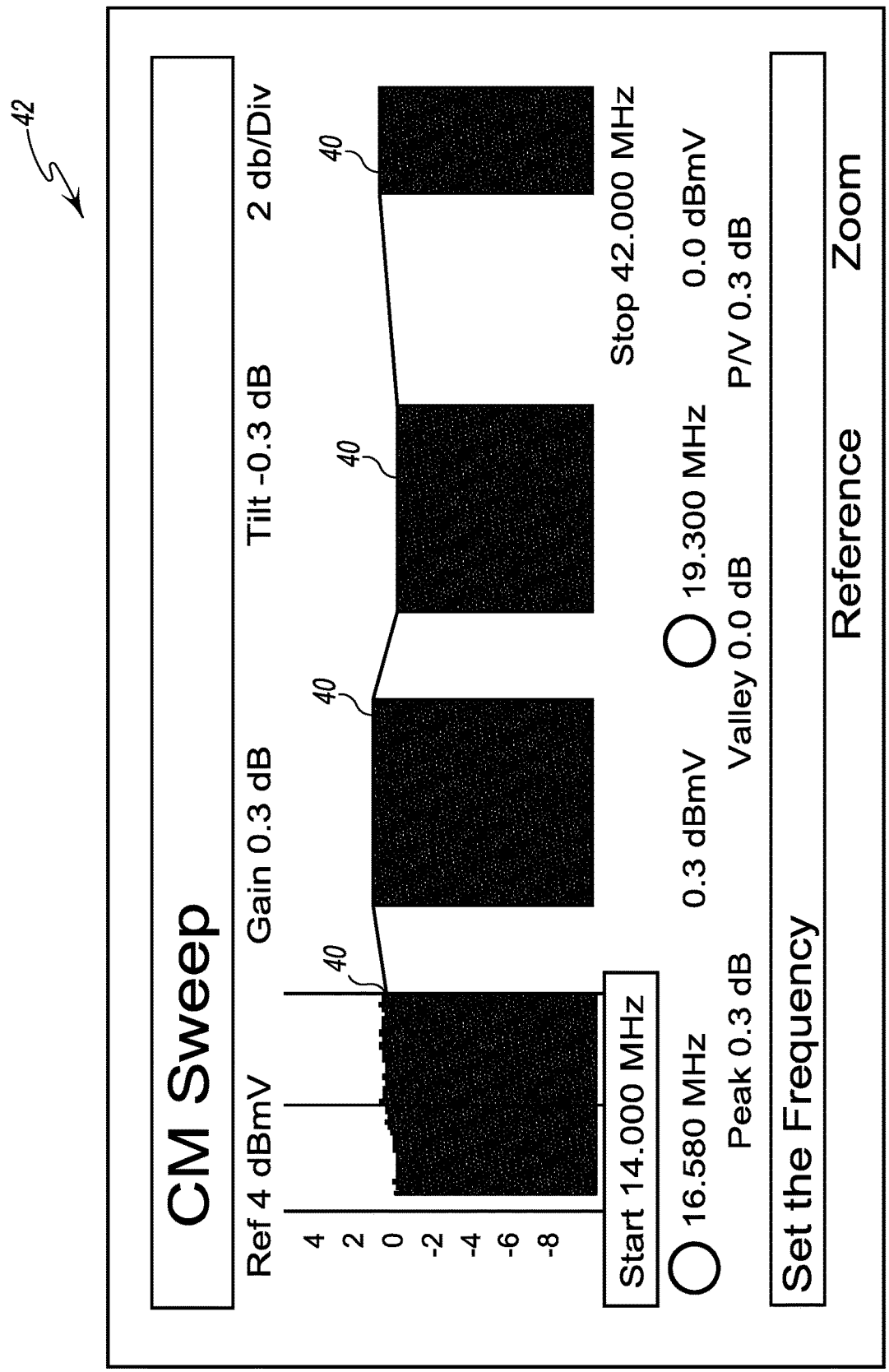
FIG. 3 illustrates a return band, or upstream, sweep using DOCSIS carriers; and, FIG. 4 illustrates a method for using the existing upstream carriers from a cable modem to calculate the linearity of a CATV return band.

This design uses the existing DOCSIS 3.0 (up to 8 carriers) or DOCSIS 3.1 (up to 8192 carriers) carriers generated by field test equipment or by the subscriber modems to discover the amplitude response of the return band. FIG. 3 illustrates a return band, or upstream, sweep using DOCSIS carriers, as described in greater detail below.

When a DOCSIS-compliant cable modem, such as the modems 14 or test equipment containing a cable modem, such as a Trilithic 360 DSP, turns on and logs into the CMTS 12, all carriers used by each modem 14 are controlled so that they are received and measured at the CMTS 12 with equal power levels (typically 0 dBmV). The cable modems 14 have individual carrier level control and always know at what power level they are transmitting upstream.

In the downstream direction, the cable modems 14 are commanded with "ranging messages" from the CMTS 12. These ranging messages command each cable modem 14 to increase or decrease individual carriers' power levels so that they are all received at the CMTS 12 at uniform amplitude. The CMTS 12 continuously commands the cable modems 14 via the ranging messages, adjusting each carrier level (hereinafter sometimes carrier ranging error level). In the case where a signal from a cable modem 14 is not being received at the CMTS 12 at the correct power level (even though the transmit carrier power level is at maximum), the CMTS 12 continuously commands that cable modem 14 to increase its power level by whatever amount is needed to provide the correct received power level. This information enters into the calculations below.

Another method of checking the carrier ranging error level is to request the CMTS 12 for the individual transmit carrier power levels via the Simple Network Management Protocol (hereinafter sometimes SNMP) Management Information Base (hereinafter sometimes MIB) residing in the CMTS 12. This is an SNMP read command through the cable modem 14 to the CMTS 12. It is preferable to read the ranging messages inside the cable modem 14, but these are not always available in all cable modems 14.

The cable modems 14 also use pre-equalization (transmit filter) coefficients to control the in-channel amplitude response (flatness) of the individual carriers. Since the individual carriers are bandwidth-occupying QAM, it is important to control the flatness within the QAM channel. The CMTS 12 measures the frequency response of an individual cable modem QAM carrier. The CMTS 12 then computes the filter coefficients (the previously mentioned 24 data points) that represent an inverted version of this frequency response. These inverse filter coefficients are transmitted down to the cable modem so that the DOCSIS carrier can be adjusted by the inverse frequency shape, that is, equalized, before it is transmitted so that it arrives at the CMTS 12 with minimal in-channel amplitude variation. These filter coefficients can be modified every few seconds to continuously adjust the shape of the transmitted carriers.

Figure 4:
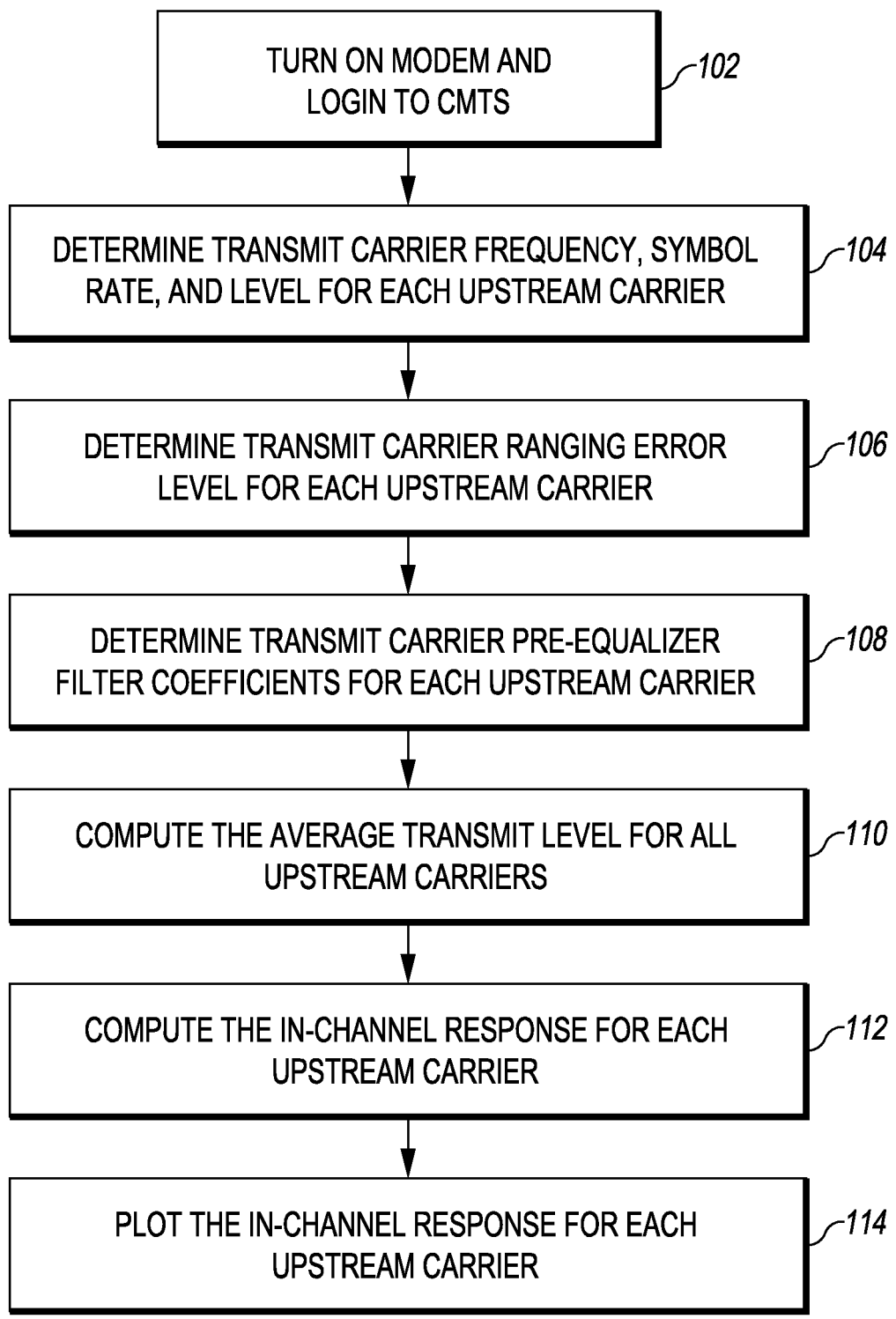

Referring now to FIG. 4, an algorithm or method 100 for using the existing upstream carriers from a cable modem to calculate the linearity of a CATV return band is shown. In block 102, a technician or other user may position a cable modem 14 at a desired location in a subscriber's home or anywhere in the CATV plant. The technician may then turn on a cable modem 14 and allow it to log in to the CMTS 12. The method 100 may then advance to block 104.

In block 104, the technician may read from the cable modem 14 the transmit carrier frequency, symbol rate, and level for each upstream carrier being used. As described above, cable systems provide either four or eight active upstream channels or carriers in the upstream band, but there are plans to provide as many as 8192 upstream channels or carriers in the not-too-distant future. The technician may utilize an analyzer or other piece of test equipment to determine the transmit carrier frequency, symbol rate, and level for each upstream carrier. The method 100 may then advance to block 106.

In block 106, the technician may determine the transmit carrier ranging error level (+/−dB) for each upstream carrier in use. To do so, the technician may use an analyzer to access the transmit carrier ranging error level via the cable modem 14. The transmit carrier ranging error level information is also available via the CMTS 12 through the Simple Network Management Protocol Management Information Base or SNMP MIB.

The method 100 may then advance to block 108 in which the technician may determine the transmit carrier pre-equalizer filter coefficients for each upstream carrier in use. To do so, the technician may again use an analyzer to access the information via the cable modem 14. It should be appreciated that blocks 102, 104, 106, and 108 have been described as separate steps for discussion purposes only and that in other embodiments the tasks performed in those blocks or any of the blocks of the method 100 may be performed contemporaneously or automatically.

At the completion of block 108, the method may advance to block 110 in which the technician offsets each upstream carrier level of the cable modem 14 by its ranging error. As described above, the upstream carrier levels are determined in block 104 and the ranging error for each upstream carrier is determined in block 106. Using that information, the technician may then compute the average transmit level for all of the carriers. This average level will become the zero reference on the graph shown in, for example, FIG. 3.

The method may then advance to block 112 in which the technician uses the upstream pre-filter coefficients identified in block 108 to compute the in-channel response for each cable modem upstream carrier. The 24 equalizer data points can be processed through an FFT of reasonable size, for example, 32 points, providing 32 output points separated by the symbol rate of the carrier divided by 32, $f_{sym}/32$. This FFT output can then be normalized around zero and offset by the average transmit level calculated in block 110.

In block 114, the technician may plot each upstream carrier's in-channel response 40 for a frequency spectrum view 42 of the return band's frequency response, as shown in FIG. 3. By using the transmit power of the cable modem 14 for each DOCSIS carrier in the return band, the offset error of each DOCSIS carrier in the return band, and the in-channel pre-equalizer filter coefficients for each DOCSIS carrier in the return band, an accurate representation of the upstream frequency response can be constructed.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. For example, the two disclosed methods could be combined for complete spectral coverage.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A method for determining return band frequency characteristics of a cable television (CATV) return band comprising:
   determining, with test equipment comprising a signal analyzer, a transmit carrier frequency, a symbol rate, and a level for each active carrier of a plurality of active carriers in the CATV return band;
   accessing a transmit carrier ranging error level for each active carrier by:
   repeatedly transmitting ranging messages to a cable modem, wherein each ranging message instructs the cable modem to increase or decrease each active carrier's level;
   accessing a corresponding number of transmit carrier pre-equalizer filter coefficients that represent an inverted frequency response for each active carrier;
   determining transmit carrier pre-equalizer filter coefficients for each active carrier;
   adjusting each active carrier using a corresponding pre-equalizer filter coefficient to minimize in-channel amplitude variation;
   adjusting a level for each active carrier following each ranging message, wherein the level for each active carrier is adjusted by its transmit carrier ranging error level;
   determining an average transmit level for the plurality of active carriers;
   determining an in-channel response for each active carrier based on the transmit carrier pre-equalizer filter coefficients for the active carrier, wherein the in-channel response for each active carrier comprises an in-channel amplitude flatness for each active carrier;
   generating a return band frequency response for the CATV return band, wherein the return band frequency response comprises in-channel responses of one or more of the plurality of active carriers across a frequency spectrum of the return band; and
   generating a display of the return band frequency response, the display including the average transmit level for the plurality of active carriers.

2. The method of claim 1 wherein accessing a transmit carrier ranging error level for each active carrier comprises:
   determining the transmit carrier ranging error level for each active carrier further using a Cable Modem Termination System (CMTS) Simple Network Management Protocol (SNMP) Management Information Base (MIB).

3. The method of claim 1 wherein determining transmit carrier pre-equalizer filter coefficients for each active carrier comprises:
   determining the transmit carrier pre-equalizer filter coefficients for each active carrier from the cable modem in the test equipment.

4. The method of claim 1 wherein generating a display of the return band frequency response comprises:
   establishing the average transmit level as a zero reference of the return band frequency response.

5. The method of claim 4, wherein generating a return band frequency response comprises:
   plotting the in-channel response for each active carrier with the zero reference.

6. The method of claim 1, wherein the display of the return band frequency response comprises an amplitude response of each active carrier.

7. A test equipment to test a cable television (CATV) return band, the test equipment comprising:
   a cable modem; and
   a signal analyzer,
   wherein the test equipment is to:
   energize the cable modem to log in to a Cable Modem Termination System (CMTS) and generate a plurality of active carriers in the CATV return band, each active carrier being a Data Over Cable Service Interface Specifications (DOCSIS)-compliant carrier;

determine, with the signal analyzer, a transmit carrier frequency and a level for each active carrier;
access a transmit carrier ranging error level for each active carrier by:
repeated transmission of ranging messages to the cable modem, wherein each ranging message instructs the cable modem to increase or decrease each active carrier's level;
access a corresponding number of transmit carrier pre-equalizer filter coefficients that represent an inverted frequency response for each active carrier;
determine transmit carrier pre-equalizer filter coefficients for each active carrier;
adjust each active carrier using a corresponding pre-equalizer filter coefficient to minimize in-channel amplitude variation;
adjust a level for each active carrier following each ranging message;
determine transmit carrier pre-equalizer filter coefficients for each active carrier via the cable modem;
compute an average transmit level for the plurality of active carriers;
determine an in-channel response for each active carrier in the return band based on the transmit carrier pre-equalizer filter coefficients for each active carrier, wherein the in-channel response for each active carrier comprises an in-channel amplitude flatness for each active carrier; and
generate a return band frequency response for the CATV return band based on the in-channel response for each active carrier in the return band, wherein the return band frequency response comprises in-channel responses of one or more of the plurality of active carriers across a frequency spectrum of the return band.

8. The test equipment of claim 7, wherein to access a transmit carrier ranging error level for each active carrier, the test equipment is to:
determine the transmit carrier ranging error level for each active carrier further using a CMTS Simple Network Management Protocol (SNMP) Management Information Base (MIB).

9. The test equipment of claim 7, wherein the test equipment is to:
establish the average transmit level as a zero reference of the return band frequency response.

10. The test equipment of claim 9, wherein to generate a return band frequency response, the test equipment is to:
generate a plot of each active carrier's in-channel response on a display with the zero reference.

11. The test equipment of claim 10, wherein the plot of each active carrier's in-channel response includes an amplitude response of each active carrier with the zero reference.

12. The test equipment of claim 7, wherein the cable modem adjusts the level for each active carrier by its ranging error and determines the average transmit level based on the adjustments.

13. The test equipment of claim 7, wherein the test equipment updates a graphical display based on the average transmit level.

14. A method for determining linearity of an amplitude response of a cable television (CATV) return band comprising:
energizing a cable modem to log in to a Cable Modem Termination System (CMTS) and generate a plurality of active carriers in the CATV return band, each active carrier of the plurality of active carriers being a Data Over Cable Service Interface Specifications (DOCSIS)-compliant carrier;
determining, with test equipment, a transmit carrier frequency and a level for each active carrier of the plurality of active carriers;
accessing a transmit carrier ranging error level for each active carrier of the plurality of active carriers in the CATV return band by:
repeatedly transmitting ranging messages to the cable modem, wherein each ranging message instructs the cable modem to increase or decrease each active carrier's level;
accessing a corresponding number of transmit carrier pre-equalizer filter coefficients that represent an inverted frequency response for each active carrier;
determining transmit carrier pre-equalizer filter coefficients for each active carrier;
adjusting each active carrier using a corresponding pre-equalizer filter coefficient to minimize in-channel amplitude variation;
adjusting a level for each active carrier following each ranging message, wherein the level for each active carrier is adjusted by its ranging error;
computing an average transmit level for the plurality of active carriers; and
generating a return band frequency response for the CATV return band including an in-channel amplitude response for each active carrier and a zero reference of a frequency spectrum of the CATV return band, wherein the in-channel amplitude response for each active carrier comprises an in-channel amplitude flatness for each active carrier and the zero reference is based on the average transmit level.

15. The method of claim 14, wherein accessing a transmit carrier ranging error level for each active carrier comprises:
determining the transmit carrier ranging error level for each active carrier further using a Cable Modem Termination System (CMTS) Simple Network Management Protocol (SNMP) Management Information Base (MIB).

16. The method of claim 14, wherein generating a return band frequency response comprises:
generating the return band frequency response based on the level for each active carrier, an offset for each active carrier determined from the transmit carrier ranging error level for each active carrier, and the transmit carrier pre-equalizer filter coefficients for each active carrier.

17. The method of claim 14, wherein determining transmit carrier pre-equalizer filter coefficients for each active carrier comprises:
determining the transmit carrier pre-equalizer filter coefficients for each active carrier from a cable modem.

18. The method of claim 14, comprising:
updating the return band frequency response based on recalculating the average transmit level.

* * * * *